United States Patent
Takenaka (10) Patent No.: US 10,637,106 B2
(45) Date of Patent: Apr. 28, 2020

(54) ELECTRICITY STORAGE SYSTEM, ELECTRICITY STORAGE APPARATUS, AND ELECTRICITY STORAGE SYSTEM CONTROL METHOD

(71) Applicant: KYOCERA CORPORATION, Kyoto-shi, Kyoto (JP)

(72) Inventor: Tetsuya Takenaka, Yamato (JP)

(73) Assignee: KYOCERA Corporation, Kyoto (JP)

( * ) Notice: Subject to any disclaimer, the term of this patent is extended or adjusted under 35 U.S.C. 154(b) by 100 days.

(21) Appl. No.: 15/763,413

(22) PCT Filed: Sep. 29, 2016

(86) PCT No.: PCT/JP2016/004405
§ 371 (c)(1),
(2) Date: Mar. 26, 2018

(87) PCT Pub. No.: WO2017/056503
PCT Pub. Date: Apr. 6, 2017

(65) Prior Publication Data
US 2018/0287217 A1    Oct. 4, 2018

(30) Foreign Application Priority Data
Sep. 29, 2015   (JP) .................................. 2015-192188

(51) Int. Cl.
*H01M 10/42*   (2006.01)
*H01M 10/44*   (2006.01)
(Continued)

(52) U.S. Cl.
CPC ......... *H01M 10/425* (2013.01); *H01M 10/44* (2013.01); *H01M 10/441* (2013.01);
(Continued)

(58) Field of Classification Search
USPC ........................................................ 307/20
See application file for complete search history.

(56) References Cited

U.S. PATENT DOCUMENTS 9,368,992 B2    6/2016   Suzuki
9,627,907 B2    4/2017   Ohashi et al.
(Continued)

FOREIGN PATENT DOCUMENTS

JP    2008-099527 A    4/2008
JP    2013-192327 A    9/2013
(Continued)

OTHER PUBLICATIONS

International Search Report for related PCT application No. PCT/JP2016/004405, dated Dec. 6, 2016; 2 pages.
(Continued)

*Primary Examiner* — Hal Kaplan
*Assistant Examiner* — Xuan Ly
(74) *Attorney, Agent, or Firm* — Procopio Cory Hargreaves and Savitch LLP (57) ABSTRACT

When operating electricity storage apparatuses in parallel, the degree of degradation of the electricity storage apparatuses is made uniform without using another apparatus or the like. An electricity storage system includes a plurality of electricity storage apparatuses configured to connect to a power grid and supply power to a load and a detector configured to detect a forward power flow from the power grid. The plurality of electricity storage apparatuses includes a plurality of storage cells configured to be charged using electric power supplied by the power grid and a plurality of power controllers configured to control charging and discharging of respective storage cells in the plurality of storage cells. Each of the plurality of power controllers sets a condition for starting discharge of each of the plurality of
(Continued)

storage cells on the basis of the state of each of the plurality of storage cells.

16 Claims, 3 Drawing Sheets

(51) Int. Cl.
*H02J 3/38* (2006.01)
*H02J 7/00* (2006.01)
*H01M 10/48* (2006.01)
*H02J 3/32* (2006.01)
*H02J 7/34* (2006.01)

(52) U.S. Cl.
CPC .......... *H01M 10/482* (2013.01); *H02J 3/32* (2013.01); *H02J 7/0021* (2013.01); *H02J 7/0063* (2013.01); *H01M 2010/4271* (2013.01); *H02J 3/38* (2013.01); *H02J 7/34* (2013.01); *H02J 2007/0067* (2013.01)

(56) References Cited

U.S. PATENT DOCUMENTS

| | | | |
|---|---|---|---|
| 2013/0320930 A1 | 12/2013 | Suzuki | |
| 2015/0002102 A1* | 1/2015 | Ohashi | H01M 10/441 320/135 |
| 2015/0155720 A1* | 6/2015 | Mise | H02J 7/0013 320/107 |
| 2015/0249350 A1* | 9/2015 | Tomita | H01M 10/441 320/107 |

FOREIGN PATENT DOCUMENTS

| | | |
|---|---|---|
| JP | 2014-128152 A | 7/2014 |
| JP | 2016-025732 A | 2/2016 |
| WO | 2012/132985 A1 | 10/2012 |

OTHER PUBLICATIONS

Written Opinion and Concise Explanation in English for related PCT application No. PCT/JP2016/004405, dated Dec. 6, 2016; 6 pages.

* cited by examiner

FIG. 1

ELECTRICITY STORAGE SYSTEM, ELECTRICITY STORAGE APPARATUS, AND ELECTRICITY STORAGE SYSTEM CONTROL METHOD

CROSS-REFERENCE TO RELATED APPLICATION

The present application claims priority to and the benefit of Japanese Patent Application No. 2015-192188 filed Sep. 29, 2015, the entire contents of which are incorporated herein by reference.

TECHNICAL FIELD

The present disclosure relates to an electricity storage system, an electricity storage apparatus, and an electricity storage system control method.

BACKGROUND

To improve the stability of output from electricity storage apparatuses, demand has recently increased for the installation of a plurality of electricity storage apparatuses in a consumer facility or the like. In the electricity storage system disclosed in patent literature (PTL) 1, a control apparatus monitors the state of charge (SOC) and the number of discharges of the storage cell in each electricity storage apparatus. The control apparatus in the electricity storage system disclosed in PTL 1 also performs control, in accordance with the state of each storage cell, to discharge the storage cells in order from the storage cell with the highest priority.

CITATION LIST

Patent Literature

PTL 1: JP 2013-192327 A

SUMMARY

An electricity storage system according to an embodiment of the present disclosure comprises a plurality of electricity storage apparatuses configured to connect to a power grid and supply power to a load and a detector configured to detect a forward power flow from the power grid. The plurality of electricity storage apparatuses comprises a plurality of storage cells configured to be charged using electric power supplied by the power grid and a plurality of power controllers configured to control charging and discharging of respective storage cells in the plurality of storage cells. Each of the plurality of power controllers sets a condition for starting discharge of each of the plurality of storage cells on the basis of a state of each of the plurality of storage cells.

An electricity storage apparatus according to an embodiment of the present disclosure is configured to connect to a power grid and supply electric power to a load. The electricity storage apparatus comprises a storage cell configured to supply electric power to the load by discharging and a power controller configured to control charging and discharging of the storage cell. The power controller sets a condition for starting discharge of the storage cell on the basis of a state of the storage cell.

A control method according to an embodiment of the present disclosure is for an electricity storage system comprising a plurality of electricity storage apparatuses and a detector configured to detect a forward power flow from a power grid, each electricity storage apparatus including a storage cell. The control method of an electricity storage system comprises setting a condition for starting discharge of each storage cell on the basis of a state of each storage cell. The control method of an electricity storage system also comprises discharging electric power from each storage cell in accordance with the condition upon detecting forward power flow from the detector.

DETAILED DESCRIPTION

Depending on the contract between a consumer facility and an electric power provider, the power from a storage cell that is not using renewable energy might not be allowed to flow in reverse to the power grid (i.e. to the electric power provider). In this case, a current sensor for detecting the current between the power grid and an electricity storage apparatus that includes the storage cell is installed in the electricity storage apparatus to prevent reverse power flow from the electricity storage apparatus to the power grid when the electricity storage apparatus is connected to the power grid. The electricity storage apparatus performs charging and discharging control of the storage cell so that a predetermined forward power flow (current flowing from the power grid toward the consumer facility) passes through the current sensor to prevent reverse power flow to the power grid. When, for example, the current flowing through the current sensor is smaller than a predetermined forward power flow, the electricity storage apparatus suspends power discharge to prevent reverse power flow. When, for example, the current flowing through the current sensor is greater than a predetermined forward power flow, the electricity storage apparatus discharges electric power from the storage cell and supplies the electric power to a load, such as an electrical device in the consumer facility.

When a plurality of electricity storage apparatuses are connected between the power grid and the load and are operated in parallel, a respective current sensor is installed in each electricity storage apparatus. Each electricity storage apparatus controls the charging and discharging of the storage cell in the electricity storage apparatus so that a predetermined forward power flow passes through the respective current sensor. At this time, depending on the arrangement of the current sensor of the electricity storage apparatus, for example, charging and discharging by the electricity storage apparatus towards the load side tends to be prioritized. For example, suppose that the electricity storage apparatus provided towards the load side controls the charging and discharging of the storage cell in the electricity storage apparatus so that a predetermined forward power flow passes through the respective current sensor. The current sensor of the electricity storage apparatus provided on the power grid side then detects the predetermined forward power flow that has already been controlled by the electricity storage apparatus towards the load side. The electricity storage apparatus on the power grid side therefore ceases to discharge the storage cell. Consequently, the further the storage cell of the electricity storage apparatus is provided towards the load side, the greater the number of times the storage cell repeatedly charges and discharges.

The storage cell tends to degrade faster as the number of times that charging and discharging is repeated increases. For example, when electricity storage apparatuses provided towards the load side are charged and discharged on a priority basis, degradation may proceed faster for the storage cell of the electricity storage apparatus that is provided further towards the load side. In this way, when a plurality of electricity storage apparatuses are operated in parallel, providing current sensors to prevent reverse power flow might cause an uneven degree of degradation among the storage cells.

First Embodiment

A first embodiment of the present disclosure is first described. The predetermined forward power flow that serves as the basis for determining whether to discharge a storage cell during control to prevent reverse power flow from the above-described storage cell to the power grid is referred to below as a forward power flow threshold. In the first embodiment, the forward power flow threshold is described as being 0 W, but values other than 0 W may also be used as the forward power flow threshold.

[System Configuration]

Figure 1:
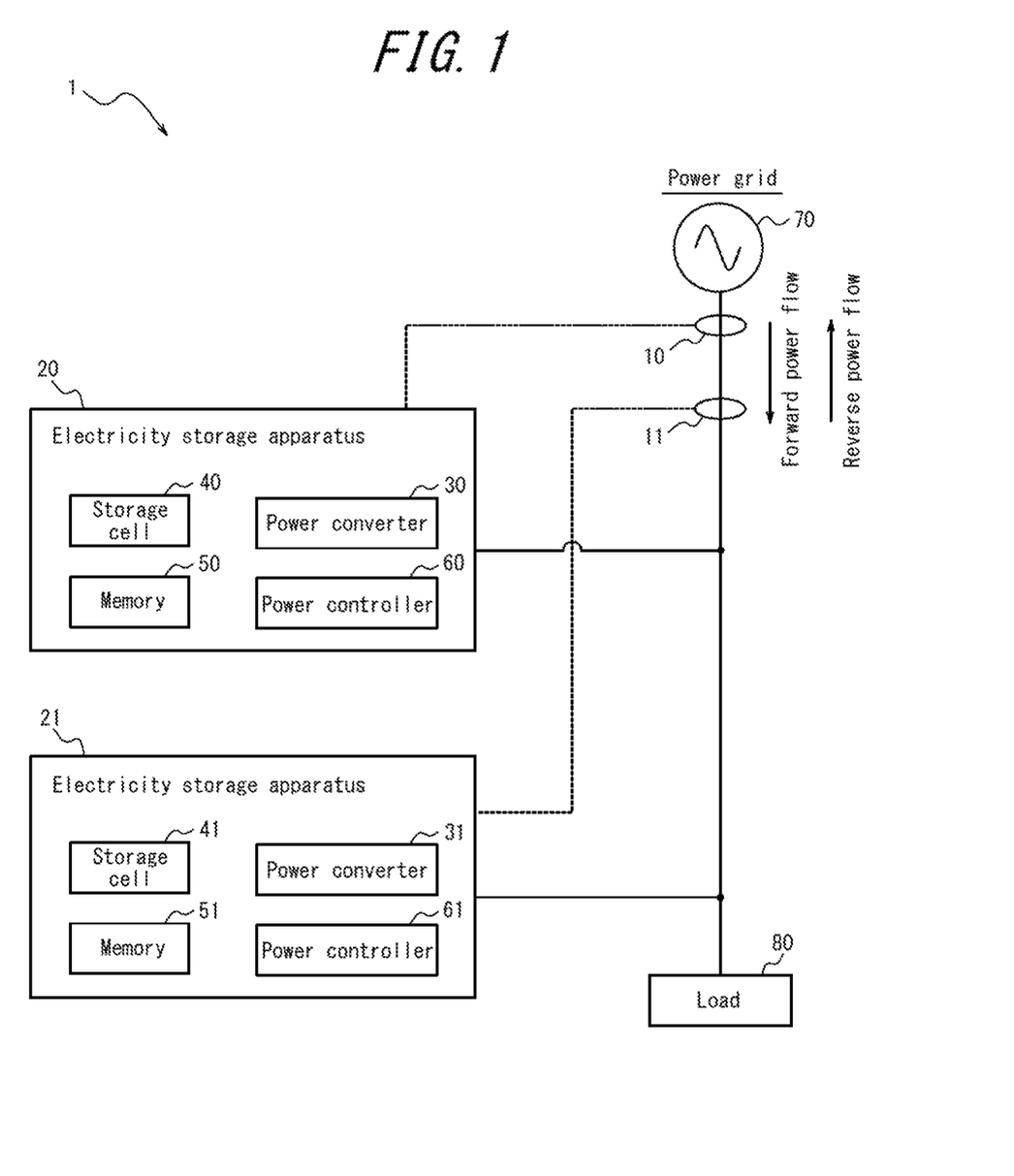
FIG. 1 illustrates an example of the configuration of an electricity storage system according to a first embodiment of the present disclosure.

As illustrated in FIG. 1, the electricity storage system 1 according to the first embodiment of the present disclosure includes current sensors (detectors) 10, 11 and electricity storage apparatuses 20, 21. The electricity storage system 1 is used while connected to a power grid 70, and supplies electric power to a load 80. The load 80, which is an electrical device, for example, consumes the electric power supplied by the electricity storage system 1 and the power grid 70. The electricity storage system 1 illustrated in FIG. 1 includes two electricity storage apparatuses 20, 21. The number of electricity storage apparatuses provided in the electricity storage system 1 may be three or more. The solid lines connecting functional blocks in FIG. 1 indicate power lines. The dashed lines in FIG. 1 indicate control lines and signal lines. The connections indicated by the control lines and signal lines may be wired connections or wireless connections.

Current sensors 10, 11 are both provided at positions for detecting the same forward power flow and reverse power flow current values from the power grid 70. In FIG. 1, the current sensors 10, 11 are provided between the power grid 70 and the electricity storage apparatus 20. The current sensors 10, 11 detect the value of forward power flow from the power grid 70 or of reverse power flow to the power grid 70 and transmit the detected value to the respective electricity storage apparatuses 20, 21.

FIG. 1 illustrates an example in which two current sensors 10, 11 are provided between the power grid 70 and the electricity storage apparatus 20, but the number of current sensors provided between the power grid 70 and the electricity storage apparatus 20 may be one. When only one current sensor is provided between the power grid 70 and the electricity storage apparatus 20, the current sensor transmits the detected values to the electricity storage apparatuses 20, 21.

The electricity storage apparatuses 20, 21, which are connected to the power grid 70, supply electric power to the load 80. The electricity storage apparatus 20 includes a power converter 30, a storage cell 40, a memory 50, and a power controller 60. The electricity storage apparatus 21 includes a power converter 31, a storage cell 41, a memory 51, and a power controller 61.

When discharging the storage cells 40, 41 on the basis of control by the power controllers 60, 61, the power converters 30, 31 respectively convert the direct current (DC) power discharged by the storage cells 40, 41 to alternating current (AC) power and supply the AC power to the load 80. On the basis of control by the power controllers 60, 61, the power converters 30, 31 also respectively convert AC power supplied by the power grid 70 to DC power and supply the DC power to the storage cells 40, 41. The storage cells 40, 41 are thus charged.

The power controllers 60, 61 respectively control charging and discharging of the storage cells 40, 41 through the power converters 30, 31. On the basis of the state of the storage cells 40, 41, the power controllers 60, 61 respectively set a condition for starting to discharge the storage cells 40, 41 and perform charging and discharging control of the storage cells 40, 41 in accordance with the set condition. This processing is performed by a controller, which includes a suitable processor, in the power controllers 60, 61. Details of this processing are provided below.

The storage cells 40, 41 respectively supply DC power to the power converters 30, 31 by discharging the stored electricity. The storage cells 40, 41 respectively charge with electric power supplied by the power grid 70. The storage cells 40, 41 are, for example, lithium-ion storage cells, nickel-hydrogen cells, lead-acid batteries, or the like. In addition, storage cells used in "vehicle to home" (V2H) systems may be used as the storage cells 40, 41.

The memories 50, 51 store information including the state of the respective storage cells 40, 41 and a program with a description of processing to implement the functions of the respective power controllers 60, 61. The information including the state of the storage cells 40, 41 is described below.

The processing to set the condition for the power controllers 60, 61 to start discharge of the storage cells 40, 41 is described below.

In the first embodiment, the condition for starting discharge is a standby time from detection of forward power flow by the current sensors 10, 11 until discharge of the storage cells 40, 41 is started. In the first embodiment, the usage frequency of the storage cells 40, 41 is determined by the state of the storage cells 40, 41, and the standby time in the storage cells 40, 41 is set shorter for lower usage frequencies. By thus setting the standby time until discharge starts to be shorter for lower usage frequencies, the storage cells are discharged in order starting from the storage cell with the lowest usage frequency. Examples of the state of the storage cells 40, 41 include the charge state of the storage cells 40, 41, the number of charges and discharges of the storage cells 40, 41, the elapsed time since the previous discharge of the storage cells 40, 41, and the total charging and discharging time of the storage cells 40, 41. Examples of setting the standby time using these examples of states are described below, taking the power controller 60 as an example.

When, for example, the power controller 60 sets the standby time on the basis of the charge state of the storage cell 40, the power controller 60 refers to the charge state of the storage cell 40 stored in the memory 50 and sets the standby time of the storage cell 40 to be shorter as the charge state is "better". A good charge state means that the charge ratio (the remaining charge vs. the full charge) is high. When, for example, the power controller 60 sets the standby time on the basis of the number of charges and discharges of the storage cell 40, the power controller 60 refers to the number of charges and discharges of the storage cell 40 stored in the memory 50 and sets the standby time of the storage cell 40 to be shorter as the number of charges and discharges is lower. When the power controller 60 sets the standby time on the basis of the elapsed time since the previous discharge of the storage cell 40, the power controller 60 refers to the elapsed time of the storage cell 40 stored in the memory 50 and sets the standby time of the storage cell 40 to be shorter as the elapsed time is longer. When the power controller 60 sets the standby time on the basis of the total charging and discharging time of the storage cell 40, the power controller 60 refers to the total charging and discharging time of the storage cell 40 stored in the memory 50 and sets the standby time of the storage cell 40 to be shorter as the total charging and discharging time is shorter.

The power controller 60 may, for example, use a combination of two or more of the charge state of the storage cell 40, the number of charges and discharges of the storage cell 40, the elapsed time since the previous discharge of the storage cell 40, and the total charging and discharging time of the storage cell 40 to set the standby time. When, for example, the power controller 60 sets the standby time by a combination of the charge state and the number of charges and discharges of the storage cell 40, the power controller 60 appropriately weights the standby time set on the basis of the charge state and the standby time set on the basis of the number of charges and discharges. The power controller 60 then calculates the standby time by totaling the results of the weighting.

The power controller 60 periodically sets the above-described standby time.

The power controllers 60, 61 each stand by for the duration of the respectively set standby time upon detecting forward power flow on the basis of the value acquired from the current sensors 10, 11. After the set standby time elapses, the power controllers 60, 61 then each start discharge of the respective storage cells 40, 41.

The standby times may be set by the power controllers 60, 61 communicating with each other and periodically alternating between setting a short standby time and a long standby time. A home energy management system (HEMS) may also set the standby times of the power controllers 60, 61.

Operations of the electricity storage system 1 according to the first embodiment are described below.

[System Operations]

Figure 2:
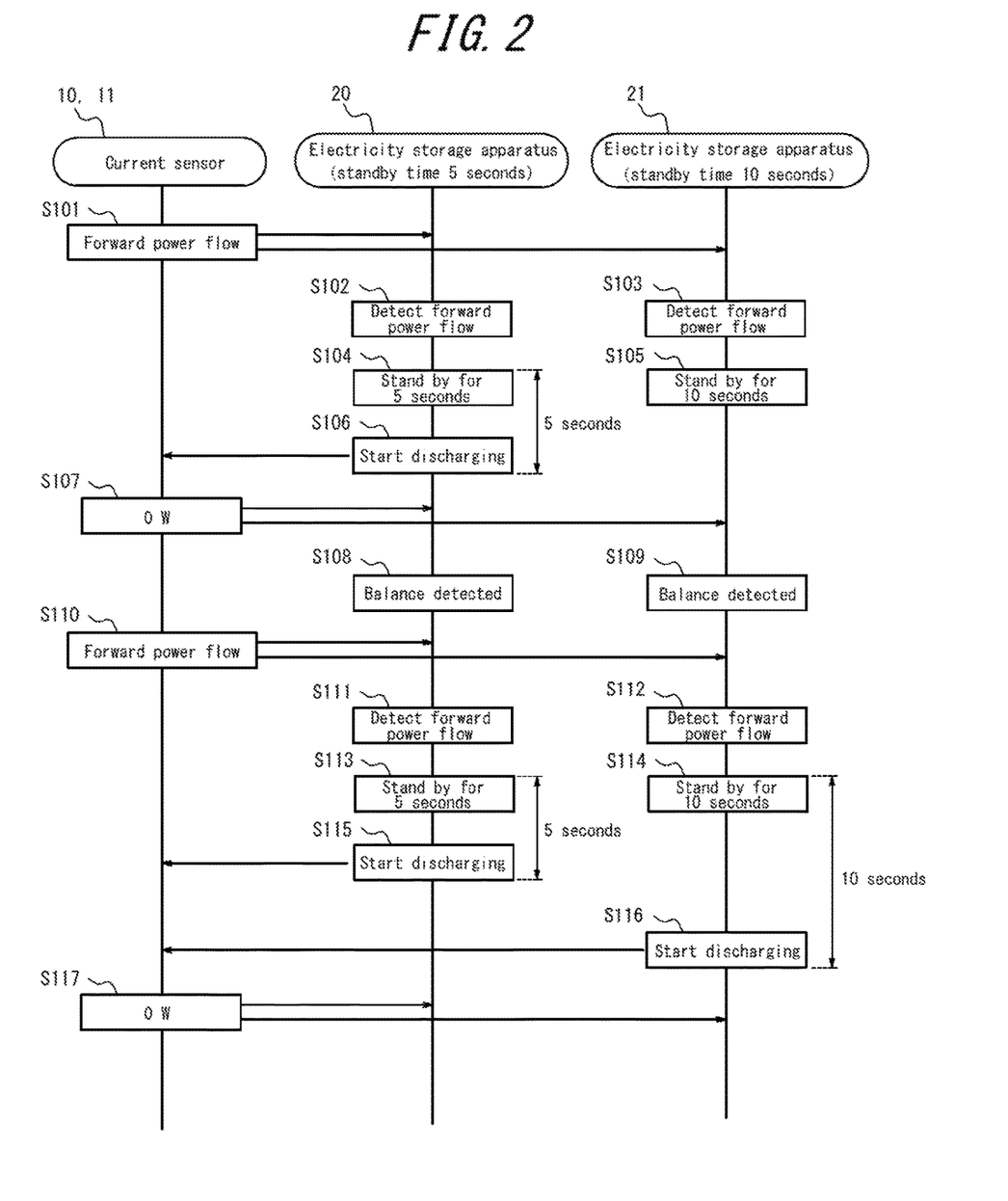
FIG. 2 is a sequence diagram illustrating an example of operations of the electricity storage system according to the first embodiment of the present disclosure.

It is assumed below that the standby time of the electricity storage apparatus 20 is set to 5 seconds by the above-described processing by the power controllers 60, 61 on the basis of the state of the storage cells 40, 41 (in other words, the usage frequency of the storage cell 40 is lower than the usage frequency of the storage cell 41). The standby time of the electricity storage apparatus 21 is assumed to be set to 10 seconds. In FIG. 2, the forward power flow is represented in watts [W], but a person skilled in the art can appropriately measure and convert the current/power. For example, the power controllers 60, 61 calculate the power value [W] of the forward power flow on the basis of the currents respectively acquired from the current sensors 10, 11 and a known voltage.

The power consumption of the load 80 increases, and forward power flow passes through the current sensors 10, 11. The current sensors 10, 11 then detect the forward power flow through their respective apparatuses (step S101) and transmit the detected value to the electricity storage apparatuses 20, 21.

Subsequently, the power controllers 60, 61 of the electricity storage apparatuses 20, 21 detect the state of forward power flow from the power grid 70 on the basis of the values acquired from the respective current sensors 10, 11 (steps S102, S103). The electricity storage apparatus 20 then stands by for 5 seconds (step S104). The electricity storage apparatus 21 stands by for 10 seconds (step S105).

Once 5 seconds have passed from the processing in step S104, the power controller 60 of the electricity storage apparatus 20 starts discharge of the storage cell 40 of the electricity storage apparatus 20 (step S106) and supplies electric power to the load 80.

The current sensors 10, 11 detect the current through their respective apparatuses (step S107) and respectively transmit the detected value to the electricity storage apparatuses 20, 21. The current acquired via the current sensors 10, 11 by the processing in step S106 is 0 W.

Subsequently, the power controller 60 of the electricity storage apparatus 20 detects, on the basis of the 0 W value acquired via the current sensor 10, that the power consumption of the load 80 and the power supplied by the electricity storage apparatus 20 are balanced (step S108). Similarly, the power controller 61 of the electricity storage apparatus 21 detects, on the basis of the 0 W value acquired via the current sensor 11, that the power consumption of the load 80 and the power supplied by the electricity storage apparatus 21 are balanced (step S109).

In this way, according to the processing in steps S101 to S109, electric power is supplied on a priority basis from the electricity storage apparatus 20, for which the standby time is set to the shorter value of 5 seconds, when the power consumption of the load 80 can be covered by the power supply from one of the electricity storage apparatuses 20 or 21.

Subsequently, the power consumption of the load 80 increases further, and forward power flow again passes through the current sensors 10, 11. The current sensors 10, 11 then detect the value of the forward power flow through their respective apparatuses (step S110) and respectively transmit the detected value to the electricity storage apparatuses 20, 21.

Subsequently, the power controllers 60, 61 of the electricity storage apparatuses 20, 21 detect the state of forward power flow from the power grid 70 on the basis of the values acquired from the respective current sensors 10, 11 (steps S111, S112). The electricity storage apparatus 20 then stands by for 5 seconds (step S113). The electricity storage apparatus 21 stands by for 10 seconds (step S114).

Once 5 seconds have passed from the processing in step S113, the power controller 60 of the electricity storage apparatus 20 starts discharge of the storage cell 40 of the electricity storage apparatus 20 (step S115) and supplies electric power to the load 80.

Once 10 seconds have passed from the processing in step S114, the power controller 61 of the electricity storage apparatus 21 starts discharge of the storage cell 41 of the electricity storage apparatus 21 (step S116) and supplies electric power to the load 80.

The current sensors 10, 11 detect the current through their respective apparatuses (step S117) and respectively transmit the detected value to the electricity storage apparatuses 20, 21. The current acquired via the current sensors 10, 11 by the processing in steps S115, S116 is 0 W.

As a result of the processing in steps S110 to S117, electric power is supplied to the load 80 by both of the electricity storage apparatuses 20, 21 when the power consumption of the load 80 is large. At this time, the storage cell 41, which has a high usage frequency, is discharged after discharging the storage cell 40, which has a low usage frequency. The amount of power discharged from the storage cell 41, which has a high usage frequency, can thereby be reduced, reducing the depth of discharge of the storage cell 41. Consequently, the progress of degradation of the storage cell 41, which has a high usage frequency, can be slowed.

In the electricity storage system 1 according to the first embodiment, the standby time until discharge is started is thus set, on the basis of the state of the storage cells 40, 41, to be shorter as the usage frequency of the storage cells 40, 41 is lower, without using other apparatuses or the like. Consequently, in the electricity storage system 1, the storage cell 40 with a low usage frequency is used first, allowing the degree of degradation of the electricity storage apparatuses 20, 21 to be made uniform. This also improves the reliability of the electricity storage system 1 overall and enables a stable supply of power.

Furthermore, even if a new electricity storage apparatus is added to the electricity storage system 1, the new electricity storage apparatus with a low usage frequency is used first in the electricity storage system 1 according to the above-described processing. The degree of degradation of the electricity storage apparatuses in the electricity storage system 1 can therefore be made uniform even when a new electricity storage apparatus is added to the electricity storage system 1.

In the electricity storage system 1 according to the first embodiment, the above-described processing is performed by the electricity storage apparatuses 20, 21 themselves, without use of another apparatus or the like. Therefore, in the electricity storage system 1, an increase in equipment costs due to the use of another apparatus can be prevented.

Second Embodiment

In the second embodiment, the condition for the start of discharge is a forward power flow threshold for starting discharge of a storage cell, and an electricity storage apparatus that discharges electric power on a priority basis is set in accordance with this forward power flow threshold.

[System Configuration]

An electricity storage system according to the second embodiment can adopt a similar configuration to that of the electricity storage system 1 according to the first embodiment. Therefore, the main differences with respect to the first embodiment are described below with reference to FIG. 1.

In the second embodiment, the usage frequency of the storage cells 40, 41 is determined by the state of the storage cells 40, 41, and the forward power flow threshold in the storage cells 40, 41 is set lower for lower usage frequencies. By thus setting the forward power flow threshold for the start of discharge to be lower for lower usage frequencies, the storage cells are discharged in order starting from the storage cell with the lowest usage frequency. As in the first embodiment, examples of the state of the storage cells 40, 41 include the charge state of the storage cells 40, 41, the number of charges and discharges of the storage cells 40, 41, the elapsed time since the previous discharge of the storage cells 40, 41, and the total charging and discharging time of the storage cells 40, 41. Examples of setting the forward power flow threshold using these examples of states are described below, taking the power controller 60 as an example.

When, for example, the power controller 60 sets the forward power flow threshold on the basis of the charge state of the storage cell 40, the power controller 60 refers to the charge state of the storage cell 40 stored in the memory 50 and sets the forward power flow threshold of the storage cell 40 to be lower as the charge state is higher. When, for example, the power controller 60 sets the forward power flow threshold on the basis of the number of charges and discharges of the storage cell 40, the power controller 60 refers to the number of charges and discharges of the storage cell 40 stored in the memory 50 and sets the forward power flow threshold of the storage cell 40 to be lower as the number of charges and discharges is lower. When the power controller 60 sets the forward power flow threshold on the basis of the elapsed time since the previous discharge of the storage cell 40, the power controller 60 refers to the elapsed time of the storage cell 40 stored in the memory 50 and sets the forward power flow threshold of the storage cell 40 to be lower as the elapsed time is longer. When the power controller 60 sets the forward power flow threshold on the basis of the total charging and discharging time of the storage cell 40, the power controller 60 refers to the total charging and discharging time of the storage cell 40 stored in the memory 50 and sets the forward power flow threshold of the storage cell 40 to be lower as the total charging and discharging time is shorter.

The power controller 60 may, for example, use a combination of two or more of the charge state of the storage cell 40, the number of charges and discharges of the storage cell 40, the elapsed time since the previous discharge of the storage cell 40, and the total charging and discharging time of the storage cell 40 to set the forward power flow threshold. When, for example, the power controller 60 sets the forward power flow threshold by a combination of the charge state and the number of charges and discharges of the storage cell 40, the power controller 60 first appropriately weights the forward power flow threshold set on the basis of the charge state and the forward power flow threshold set on the basis of the number of charges and discharges. The power controller 60 then calculates the forward power flow threshold by totaling the results of the weighting.

The power controller 60 periodically sets the above-described forward power flow threshold.

The power controllers 60, 61 start discharge of the respective storage cells 40, 41 upon detecting that the value of forward power flow acquired from the current sensors 10, 11 is greater than the respectively set forward power flow thresholds. The power controllers 60, 61 do not discharge electric power from the respective storage cells 40, 41 upon detecting that the value of forward power flow acquired from the current sensors 10, 11 is less than the respectively set forward power flow thresholds.

The forward power flow thresholds may be set by the power controllers 60, 61 communicating with each other and periodically alternating between setting a low forward power flow threshold and a high forward power flow threshold. A HEMS may also set the forward power flow thresholds.

Operations of the electricity storage system 1 according to the second embodiment are described below with reference to FIG. 3.

[System Operations]

Figure 3:
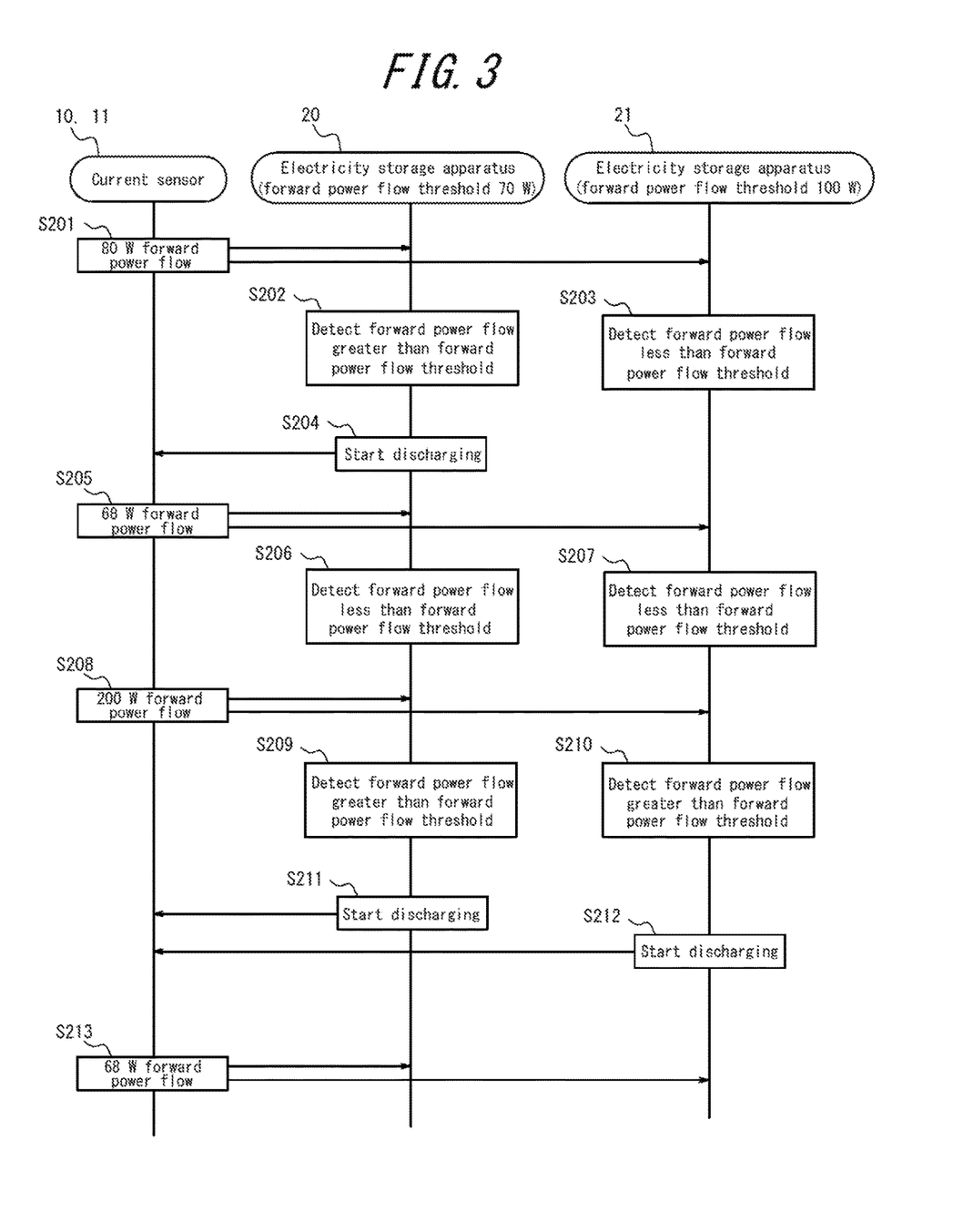
FIG. 3 is a sequence diagram illustrating an example of operations of an electricity storage system according to a second embodiment of the present disclosure.

In FIG. 3, the forward power flow and the forward power flow threshold are represented in watts [W], but a person skilled in the art can appropriately measure and convert the current/power. Furthermore, it is assumed below that the forward power flow threshold of the electricity storage apparatus 20 is set to 70 W and the forward power flow threshold of the electricity storage apparatus 21 is set to 100 W by the above-described processing by the power controllers 60, 61 on the basis of the state of the storage cells 40, 41. For example, the power controllers 60, 61 calculate the power value [W] of the forward power flow on the basis of the current acquired from the respective current sensors 10, 11 and a known voltage.

The power consumption of the load 80 increases, and forward power flow of 80 W passes through the current sensors 10, 11. The current sensors 10, 11 then detect the forward power flow through their respective apparatuses (step S201) and respectively transmit the detected value to the electricity storage apparatuses 20, 21.

Subsequently, the power controller 60 of the electricity storage apparatus 20 detects that the 80 W forward power flow acquired via the current sensor 10 is greater than the 70 W forward power flow threshold of the electricity storage apparatus 20 (step S202) and starts discharge of the storage cell 40 (step S204). The power controller 61 of the electricity storage apparatus 21 detects that the 80 W forward power flow acquired via the current sensor 11 is less than the 100 W forward power flow threshold of the electricity storage apparatus 21 (step S203) and therefore does not discharge the storage cell 41.

As a result of the processing in step S204, a forward power flow of 68 W passes through the current sensors 10, 11. The current sensors 10, 11 then detect the forward power flow through the respective apparatuses (step S205) and respectively transmit the detected value to the electricity storage apparatuses 20, 21.

Subsequently, the power controllers 60, 61 of the electricity storage apparatuses 20, 21 detect that the 68 W forward power flow acquired via the current sensors 10,11 is less than the 70 W and 100 W forward power flow thresholds of the respective electricity storage apparatuses 20, 21 (steps S206, S207). As a result, the storage cells 40, 41 are not discharged.

In this way, by the processing in steps S201 to S207, electric power is supplied on a priority basis from the electricity storage apparatus 20, for which the forward power flow threshold is set to the lower value of 70 W, when the power consumption of the load 80 can be covered by the power supply from one of the electricity storage apparatuses 20 or 21.

Subsequently, the power consumption of the load 80 increases further, and a forward power flow of 200 W passes through the current sensors 10, 11. The current sensors 10, 11 then detect the forward power flow through their respective apparatuses (step S208) and respectively transmit the detected value to the electricity storage apparatuses 20, 21.

Subsequently, the power controller 60 of the electricity storage apparatus 20 detects that the 200 W forward power flow acquired via the current sensor 10 is greater than the 70 W forward power flow threshold of the electricity storage apparatus 20 (step S209) and starts discharge of the storage cell 40 (step S211). The power controller 61 of the electricity storage apparatus 21 also detects that the 200 W forward power flow acquired via the current sensor 10 is greater than the 100 W forward power flow threshold of the electricity storage apparatus 21 (step S210) and starts discharge of the storage cell 41 (step S212).

As a result of the processing in steps S211 and S212, a forward power flow of 68 W passes through the current sensors 10, 11. The current sensors 10, 11 then detect the forward power flow through their respective apparatuses (step S213) and transmit the detected value to the electricity storage apparatuses 20, 21.

As a result of the processing in steps S208 to S213, electric power is supplied to the load 80 by both of the electricity storage apparatuses 20, 21 when the power consumption of the load 80 is large.

In the electricity storage system 1 according to the second embodiment, the forward power flow threshold for starting discharge is thus set on the basis of the state of the storage cells 40, 41 to be lower as the usage frequency of the storage cells 40, 41 is lower, without using other apparatuses or the like. Consequently, in the electricity storage system 1, the storage cell 40 with a low usage frequency is used first, allowing the degree of degradation of the electricity storage apparatuses 20, 21 to be made uniform. This also improves the reliability of the electricity storage system 1 overall and enables a stable supply of power.

The other effects of the second embodiment are similar to those of the first embodiment.

The case in which, depending on the contract between a consumer facility and an electric power provider, the power of an electricity storage apparatus, a fuel cell apparatus, or the like that is not using renewable energy is prohibited from flowing in reverse to the power grid (i.e. to the electric power provider) has been described above. However, the present embodiment can also be applied to the case in which power from an electricity storage apparatus, a fuel cell apparatus, and the like is allowed to flow in reverse to the power grid (i.e. to the electric power provider).

Although embodiments of the present disclosure have been described on the basis of drawings and examples, it is to be noted that various changes and modifications will be apparent to those skilled in the art based on the present disclosure. Therefore, such changes and modifications are to be understood as included within the scope of the present disclosure. For example, the functions and the like included in the various components and steps may be reordered in any logically consistent way. Furthermore, components or steps may be combined into one or divided.

The control of the present disclosure is described as a series of operations executed by a computer system and other hardware that can execute program instructions. Examples of the computer system and other hardware include a general-purpose computer, a personal computer (PC), a dedicated computer, a workstation, and other programmable data processing apparatuses. It should be noted that in each embodiment, various operations may be executed by a dedicated circuit (for example, individual logical gates interconnected in order to execute a particular function) implemented by program instructions (software). It should also be noted that various operations may be executed by a logical block, program module, or the like executed by one or more processors. The one or more processors that execute a logical block, program module, or the like encompass, for example, one or more of a microprocessor, a central processing unit (CPU), and a digital signal processor (DSP). The one or more processors also, for example, encompass an application specific integrated circuit (ASIC), a programmable logic device (PLD), and a field programmable gate array (FPGA). The one or more processors also, for example, encompass a controller, a microcontroller, an electronic device, another apparatus designed to be capable of executing the functions disclosed herein, and/or a combination of any of the above. The embodiments disclosed herein are, for example, implemented by hardware, software, firmware, middleware, microcode, or a combination of any of these.

The network used here may, unless indicated otherwise, be the Internet, an ad hoc network, a local area network (LAN), a cellular network, another network, or a combination of any of these.

What is claimed is:

1. An electricity storage system comprising:
   at least one electricity storage apparatus configured to connect to a power grid and supply power to a load; and
   a detector configured to detect a forward power flow from the power grid;
   wherein the electricity storage apparatus comprises:
      a storage cell configured to be charged using electric power supplied by the power grid; and
      a power controller configured to control charging and discharging of the storage cell;
   wherein the power controller sets a condition for starting discharge of the storage cell on the basis of a state of the storage cell; and
   wherein the condition is a standby time from detection of forward power flow until starting discharge of the storage cell.

2. The electricity storage system of claim 1, wherein the state of the storage cell is a charge state of the storage cell, and the power controller sets the standby time to be shorter as the charge state is better.

3. The electricity storage system of claim 1, wherein the state of the storage cell is a number of charges and discharges of the storage cell, and the power controller sets the standby time to be shorter as the number of charges and discharges is smaller.

4. The electricity storage system of claim 1, wherein the state of the of storage cell is an elapsed time since a previous discharge of the storage cell, and the power controller sets the standby time to be shorter as the elapsed time is longer.

5. The electricity storage system of claim 1, wherein the state of the storage cell is a total charging and discharging time of the storage cell, and the power controller sets the standby time to be shorter as the total charging and discharging time is shorter.

6. The electricity storage system of claim 1, wherein the state of the of storage cell is a combination of two or more of a charge state of the storage cell, a number of charges and discharges of the of storage cell, an elapsed time since a previous discharge of the storage cell, and a total charging and discharging time of the storage cell, and the power controller sets the standby time on the basis of the combination.

7. An electricity storage system comprising:
   at least one electricity storage apparatus configured to connect to a power grid and supply power to a load; and
   a detector configured to detect a forward power flow from the power grid;
   wherein the electricity storage apparatus comprises:
      a storage cell configured to be charged using electric power supplied by the power grid; and
      a power controller configured to control charging and discharging of the storage cell;
   wherein the power controller sets a condition for starting discharge of the storage cell on the basis of a state of the storage cell; and
   wherein the condition is a forward power flow threshold for starting discharge of the storage cell.

8. The electricity storage system of claim 7, wherein the state of the storage cell is a charge state of the storage cell, and the power controller sets the forward power flow threshold to be lower as the charge state is higher.

9. The electricity storage system of claim 7, wherein the state of the storage cell is a number of charges and discharges of the storage cell, and the power controller sets the forward power flow threshold to be lower as the number of charges and discharges is smaller.

10. The electricity storage system of claim 7, wherein the state of the storage cell is an elapsed time since a previous discharge of the storage cell, and the power controller sets the forward power flow threshold to be lower as the elapsed time is longer.

11. The electricity storage system of claim 7, wherein the state of the storage cell is a total charging and discharging time of the storage cell, and the power controller sets the forward power flow threshold to be lower as the total charging and discharging time is shorter.

12. The electricity storage system of claim 7, wherein the state of the of storage cell is a combination of two or more of a charge state of the storage cell, a number of charges and discharges of the storage cell, an elapsed time since a previous discharge of the storage cell, and a total charging and discharging time of the storage cell, and the power controller sets the forward power flow threshold on the basis of the combination.

13. An electricity storage apparatus configured to connect to a power grid and supply electric power to a load, the electricity storage apparatus comprising:
   a storage cell configured to supply electric power to the load by discharging; and
   a power controller configured to control charging and discharging of the storage cell;
   wherein the power controller sets a condition for starting discharge of the storage cell on the basis of a state of the storage cell, and
   wherein the condition is a standby time from detection of forward power flow until starting discharge of the storage cell.

14. A control method of an electricity storage system comprising at least one electricity storage apparatus and a detector configured to detect a forward power flow from a power grid, the electricity storage apparatus including a storage cell, the control method comprising:
   setting a condition for starting discharge of the storage cell on the basis of a state of the storage cell, wherein the condition is a standby time from detection of forward power flow until starting discharge of the storage cell; and
   discharging electric power from the storage cell in accordance with the condition upon detecting forward power flow from the detector.

15. An electricity storage apparatus configured to connect to a power grid and supply electric power to a load, the electricity storage apparatus comprising:
   a storage cell configured to supply electric power to the load by discharging; and
   a power controller configured to control charging and discharging of the storage cell;
   wherein the power controller sets a condition for starting discharge of the storage cell on the basis of a state of the storage cell, and
   wherein the condition is a forward power flow threshold for starting discharge of the storage cell.

16. A control method of an electricity storage system comprising at least one electricity storage apparatus and a detector configured to detect a forward power flow from a power grid, the electricity storage apparatus including a storage cell, the control method comprising:
setting a condition for starting discharge of the storage cell on the basis of a state of the storage cell, wherein the condition is a forward power flow threshold for starting discharge of the storage cell; and
discharging electric power from the storage cell in accordance with the condition upon detecting forward power flow from the detector.

\* \* \* \* \*